June 26, 1923.  H. ALLEN  1,459,869
ROD COUPLING
Filed April 13, 1922
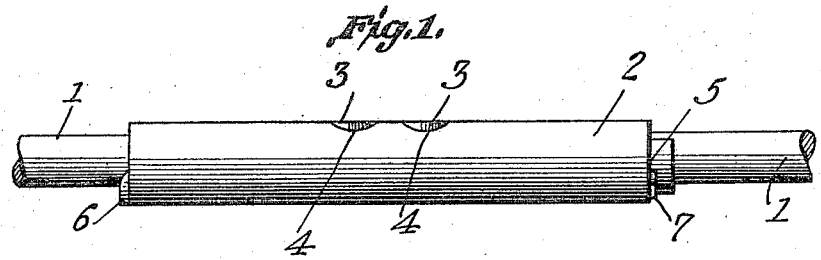
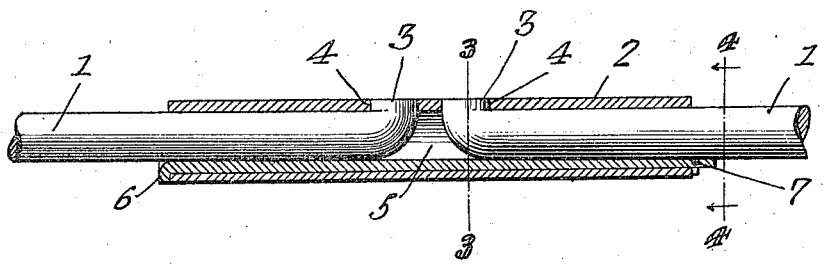
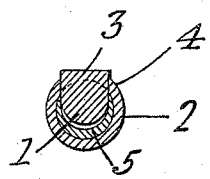
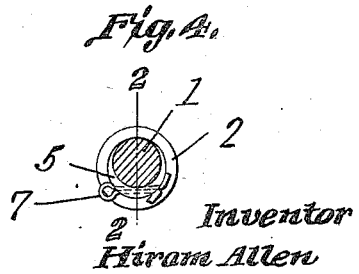
Inventor
Hiram Allen Patented June 26, 1923.

1,459,869

UNITED STATES PATENT OFFICE.

HIRAM ALLEN, OF WILLIAMSBURG, KANSAS.

ROD COUPLING.

Application filed April 13, 1922. Serial No. 552,250.

*To all whom it may concern:*

Be it known that I, HIRAM ALLEN, a citizen of the United States, residing at Williamsburg, in the county of Franklin and State of Kansas, have invented a new and useful Rod Coupling, of which the following is a specification.

This invention aims to provide a novel means for coupling together a pair of rods without threading the rods, equipping the rods with nuts, or providing other complicated elements subject to deterioration and breaking.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in side elevation, a device constructed in accordance with the invention; Figure 2 is a longitudinal section wherein parts appear in elevation; Figure 3 is a cross section on the line 3—3 of Figure 2; Figure 4 is a cross section on the line 4—4 of Figure 2.

The numeral 1 denotes a pair of rods which are to be joined. The numeral 2 marks a sleeve. The rods 1 have lateral projections 3 and the sleeve 2 has openings 4 wherein the projections 3 are received. The internal diameter of the sleeve 2 is greater than the diameter of the rods 1. Consequently, the rods 1 may be inserted endwise into the sleeve 2 and then may be moved transversely to engage the projections 3 in the openings 4. After the projections 3 have been engaged in the openings 4, a trough-shaped retainer 5 is slid endwise into the sleeve 2 between the rods 1 and that portion of the sleeve 2 which is opposite to the openings 4. A flange 6 is formed on one end of the retainer 5. The flange 6, cooperating with one end of the sleeve 2 prevents the retainer 5 from moving to the right in Figure 2. A removable securing device 7, such as a cotter pin, is inserted into the retainer 5, transversely thereof, and engages the opposite end of the sleeve 2 to prevent the retainer 5 from moving to the left in Figure 2. The retainer 5, cooperating with the rods 1, prevents the rod from moving transversely, the projections 3 on the rods remaining in the openings 4 of the sleeve 2 and it being impossible to separate the rods 1 longitudinally, until the retainer 5 has been removed from the sleeve 2 and until the projections 3 have been detached from the openings 4.

What is claimed is:—

1. In a device of the class described, a sleeve having a transverse opening; a rod in the sleeve and having a projection received in the opening; a retainer located between the sleeve and the rod and constituting means for retaining the projection in the opening, the retainer being provided at one end with a flange engaging one end of the sleeve; and a removable securing device in the retainer and engaging the other end of the sleeve.

2. In a device of the class described, a sleeve; rods having their inner ends mounted in the sleeve, the inner ends of the rods having projections engaged with the sleeve, the rods being movable transversely in the sleeve, to disengage the projections from the sleeve; a single retainer extended longitudinally of the sleeve and interposed between the inner ends of the rods and the sleeve, the retainer holding the projections engaged with the sleeve; and means for holding the retainer against endwise movement in the sleeve.

In testimony that I claim the foregoing as my own, I have hereto affixed my signature in the presence of two witnesses.

HIRAM ALLEN.

Witnesses
WM. C. FOGLE,
E. M. COLE.